US012417029B1

(12) United States Patent
Gregor et al.

(10) Patent No.: US 12,417,029 B1
(45) Date of Patent: Sep. 16, 2025

(54) MEMORY VIEW FOR MEMORY MODULE

(71) Applicant: Cadence Design Systems, Inc., San Jose, CA (US)

(72) Inventors: Steven L. Gregor, Owego, NY (US); Puneet Arora, Uttar Pradesh (IN); Ke Zhang, Austin, TX (US); Mohit Madaan, Gurugram (IN)

(73) Assignee: Cadence Design Systems, Inc., San Jose, CA (US)

( * ) Notice: Subject to any disclaimer, the term of this patent is extended or adjusted under 35 U.S.C. 154(b) by 596 days.

(21) Appl. No.: 17/895,289

(22) Filed: Aug. 25, 2022

(51) Int. Cl.
  *G06F 3/06* (2006.01)
  *G06F 11/34* (2006.01)
(52) U.S. Cl.
  CPC .......... *G06F 3/0616* (2013.01); *G06F 3/0653* (2013.01); *G06F 3/0673* (2013.01); *G06F 11/3457* (2013.01)
(58) Field of Classification Search
  USPC ......................................................... 320/100
  See application file for complete search history.

(56) References Cited

U.S. PATENT DOCUMENTS

| 6,549,476 | B2 | 4/2003 | Pinney |
| 7,371,627 | B1 | 5/2008 | Forbes |
| 8,341,733 | B2 | 12/2012 | Craft |
| 8,637,362 | B2 | 1/2014 | Forbes |
| 10,521,532 | B1 | 12/2019 | Satasia |
| 2004/0215434 | A1* | 10/2004 | Hunt .................. G06F 30/3308 703/15 |
| 2014/0268973 | A1* | 9/2014 | Connolly ................ G11C 5/04 365/63 |
| 2016/0210220 | A1 | 7/2016 | Filachek |
| 2016/0210221 | A1 | 7/2016 | Filachek |
| 2022/0164297 | A1* | 5/2022 | Sity ..................... G06F 12/1458 |

* cited by examiner

*Primary Examiner* — Brian Ngo
(74) *Attorney, Agent, or Firm* — Foley & Lardner LLP

(57) ABSTRACT

A memory view generator evaluates a module design file characterizing a memory module to generate a set of port functions that defines operations of ports on a memory module for a memory view file. The memory view generator parses a memory module bitmap characterizing a physical layout of the memory module to determine a physical memory model of address bits, an order of rows, an order of columns, an order of banks and data bits of the memory module for the physical memory view file. A circuit simulator instantiates a memory module and provide simulation results based on a simulation memory model of the memory module, the set of port functions and the physical memory model. The memory view generator analyzes the simulation results to determine operational performance characteristics of the memory module for the memory view file.

20 Claims, 8 Drawing Sheets

| #address | bit[0] | bit[1] | bit[2] | bit[3] | bit[4] |
|---|---|---|---|---|---|
| 00000 | x1,y1 | x1+1d,y1 | x1+2d,y1 | x1+3d,y1 | x1+4d,y1 |
| 00001 | x2,y1 | x2+1d,y1 | x2+2d,y1 | x2+3d,y1 | x2+4d,y1 |
| 00002 | x3,y1 | x3+1d,y1 | x3+2d,y1 | x3+3d,y1 | x3+4d,y1 |
| 00003 | x4,y1 | x4+1d,y1 | x4+2d,y1 | x4+3d,y1 | x4+4d,y1 |
| 00004 | x5,y1 | x5+1d,y1 | x5+2d,y1 | x5+3d,y1 | x5+4d,y1 |
| 00005 | x6,y1 | x6+1d,y1 | x6+2d,y1 | x6+3d,y1 | x6+4d,y1 |
| 00006 | x7,y1 | x7+1d,y1 | x7+2d,y1 | x7+3d,y1 | x7+4d,y1 |
| 00007 | x8,y1 | x8+1d,y1 | x8+2d,y1 | x8+3d,y1 | x8+4d,y1 |
| 00008 | x1b,y2 | x1b+1d,y2 | x1b+2d,y2 | x1b+3d,y2 | x1b+4d,y2 |
| 00009 | x2b,y2 | x2b+1d,y2 | x2b+2d,y2 | x2b+3d,y2 | x2b+4d,y2 |
| 0000A | x3b,y2 | x3b+1d,y2 | x3b+2d,y2 | x3b+3d,y2 | x3b+4d,y2 |
| 0000B | x4b,y2 | x4b+1d,y2 | x4b+2d,y2 | x4b+3d,y2 | x4b+4d,y2 |
| 0000C | x5b,y2 | x5b+1d,y2 | x5b+2d,y2 | x5b+3d,y2 | x5b+4d,y2 |
| 0000D | x6b,y2 | x6b+1d,y2 | x6b+2d,y2 | x6b+3d,y2 | x6b+4d,y2 |
| 0000E | x7b,y2 | x7b+1d,y2 | x7b+2d,y2 | x7b+3d,y2 | x7b+4d,y2 |
| 0000F | x8b,y2 | x8b+1d,y2 | x8b+2d,y2 | x8b+3d,y2 | x8b+4d,y2 |
| 00010 | x1b,y3 | x1b+1d,y3 | x1b+2d,y3 | x1b+3d,y3 | x1b+4d,y3 |
| 00011 | x2b,y3 | x2b+1d,y3 | x2b+2d,y3 | x2b+3d,y3 | x2b+4d,y3 |
| ... | | | | | |
| 007FF | x8b,y2047 | x8b+1d,y2047 | x8b+2d,y2047 | x8b+3d,y2047 | x8b+4d,y2047 |
| 00800 | x1b,y2097 | x1b+1d,y2097 | x1b+2d,y2097 | x1b+3d,y2097 | x1b+4d,y2097 |

FIG. 2

MEMORY VIEW FOR MEMORY MODULE

TECHNICAL FIELD

This disclosure relates to systems and methods for generating a memory view of a memory module such as random access memory (RAM) or read only memory (ROM).

BACKGROUND

Static random-access memory (static RAM or SRAM) is a type of random-access memory (RAM) that uses bistable circuitry (flip-flop) to store each bit. SRAM is volatile memory, such that data is lost when power is removed. The term 'static' differentiates SRAM from dynamic random-access memory DRAM which is periodically refreshed. SRAM is faster than DRAM; and SRAM is used for a cache and internal register files of a central processing unit (CPU) while DRAM is employed to implement a computer's main memory.

Read-only memory (ROM) is a type of non-volatile memory used in computers and other electronic devices. Data stored in ROM cannot be easily electronically modified after the manufacture of the memory device. ROM is useful for storing data that is rarely changed during the life of the system, also known as firmware. Software applications for programmable devices can be distributed as plug-in cartridges containing ROM.

In computing, a memory address is a reference to a specific memory location used at various levels by software and hardware. Memory addresses are fixed-length sequences of digits conventionally displayed and manipulated as unsigned integers. Such numerical semantic bases itself upon features of CPU (such as the instruction pointer and incremental address registers), as well upon use of the memory like an array endorsed by various programming languages.

Memory in a computing device has many memory locations. Each memory location has a physical address which is a code. The CPU (or other device) can use the code to access the corresponding memory location. Generally only certain types of system software, such as the basic input output system (BIOS), operating systems, and some specialized utility programs (e.g., memory testers), address physical memory using machine code operands or processor registers, instructing the CPU to direct a hardware device, called the memory controller, to use the memory bus or system bus, or separate control, address and data busses, to execute the program's commands. The bus of a memory controller has a number of parallel lines, each represented by a binary digit (bit). The width of the bus, and thus the number of addressable storage units, and the number of bits in each unit, varies among computers and/or the type of memory being used.

A computer program uses memory addresses to execute machine code, and to store and retrieve data. In early computers logical and physical addresses corresponded, but since the introduction of virtual memory most application programs do not have a knowledge of physical addresses. Rather, they address logical addresses, or virtual addresses, using the computer's memory management unit and operating system memory mapping.

SUMMARY

One example relates to a non-transitory machine-readable medium having machine-readable instructions. The machine-readable instructions include a memory view generator that evaluates a module design file characterizing a memory module to generate a set of port functions that defines operations of ports on a memory module for a memory view file. The memory view generator parses a memory module bitmap characterizing a physical layout of the memory module to determine a physical memory model of address bits, an order of rows, an order of columns, an order of banks and data bits of the memory module for the physical memory view file. The machine-readable instructions also include a circuit simulator that instantiates a memory module and provide simulation results based on a simulation model of the memory module, the set of port functions and the physical memory model. The memory view generator analyzes the simulation results to determine operational performance characteristics of the memory module for the memory view file.

Another example relates to a system that includes a non-transitory memory that stores machine-readable instructions. The system also includes a processing unit that accesses the memory and executes the machine-readable instructions. The machine-readable instructions include a memory view generator that evaluates a Liberty file characterizing a memory module to generate a set of port functions that defines operations of ports on a memory module for a memory view file and parses a memory module bitmap characterizing a physical layout of the memory module to determine a physical memory model of address bits, an order of rows, an order of columns, an order of banks and data bits of the memory module for the physical memory view file. The machine readable instructions also include a circuit simulator that instantiates a memory module and provide simulation results based on a simulation model of the memory module, the set of port functions and the physical memory model. The memory view generator analyzes the simulation results to determine operational performance characteristics of the memory module for the memory view file. Additionally, the system includes a memory test tool that receives the memory view file, inserts testing hardware and software into the memory module and generates a test pattern for the memory module based on the memory view file.

Yet another example relates to a method for generating a memory view of a memory module. The method includes evaluating, by a memory view generator operating on one or more computing devices, a Liberty file characterizing the memory module to generate a set of port functions that defines operations of ports on a memory module for a memory view file. The method also includes parsing, by the memory view generator, a memory module bitmap characterizing a physical layout of the memory module to determine a physical memory model of address bits, an order of rows, an order of columns, an order of banks and data bits of the memory module for the physical memory view file. The method further includes instantiating, by a circuit simulator, a memory module and provide simulation results based on a simulation model of the memory module, the set of port functions and the physical memory model. The method yet further includes analyzing, by the memory view generator, the simulation results to determine operational performance characteristics of the memory module for the memory view file.

BRIEF DESCRIPTION OF THE DRAWINGS

FIG. 2 illustrates an example of a portion of contents of a memory module bitmap file.

DETAILED DESCRIPTION

This disclosure relates to a memory view generator that receives a Liberty file, a memory module bitmap and a simulation model of a memory module. As used herein, the term "Liberty file" refers to an American Standard Code for Information Interchange (ASCII) file that contains characterization data for cells for an IC chip (e.g., the NVM module) in a standard way. More specifically, a Liberty file includes timing and power parameters for these cells. Liberty files are employable by synthesis tools and by place-and-route tools to design such IC chips. The memory view generator operates on one or more computing devices (e.g., a computing platform). The memory module is a physically instantiated IC chip, such as an SRAM or ROM chip. The Liberty file defines port (pin) operations of the memory module. Thus, the memory view generator can evaluate the Liberty file to generate a set of port functions that defines operations of ports on a memory module for a memory view file. The bitmap file characterizes a physical layout of the memory module. Accordingly, the memory view generator parses the bitmap file to determine a physical memory model of data bits and address bus to determine the number of row, column, bank bits and order of the rows and columns in each data-bit for banks of the memory module for the memory view file.

A circuit simulator is also operating on the one or more computing devices. The circuit simulator instantiates a memory module of the physical memory module and provide simulation results based on a simulation model of the memory module, the set of port functions and the physical memory model. The memory view generator analyzes the simulation results to determine operational performance characteristics of the memory module for the memory view file. The port functions, the physical memory model and the operational performance characteristics of the memory module are combined and stored in the memory view file.

A memory test tool receives the memory view file and generates a test pattern for the memory module based on the memory view file. The memory test tool can be operating on a remote computing device, in some examples. In other examples, the memory test tool can operate on the same computing device as the memory view generator or on a remote computing device. The memory test tool can be employed to test the memory module (or multiple instances of the memory module).

The system described can generate a memory view file that is employable to test the physically instantiated memory module. Moreover, the memory view generator generates the memory view file from information about the memory module. Stated differently, there is no requirement that the memory view generator be provided physical access to the memory module. However, the memory view file is still able to be employed to test the memory module.

Figure 1:
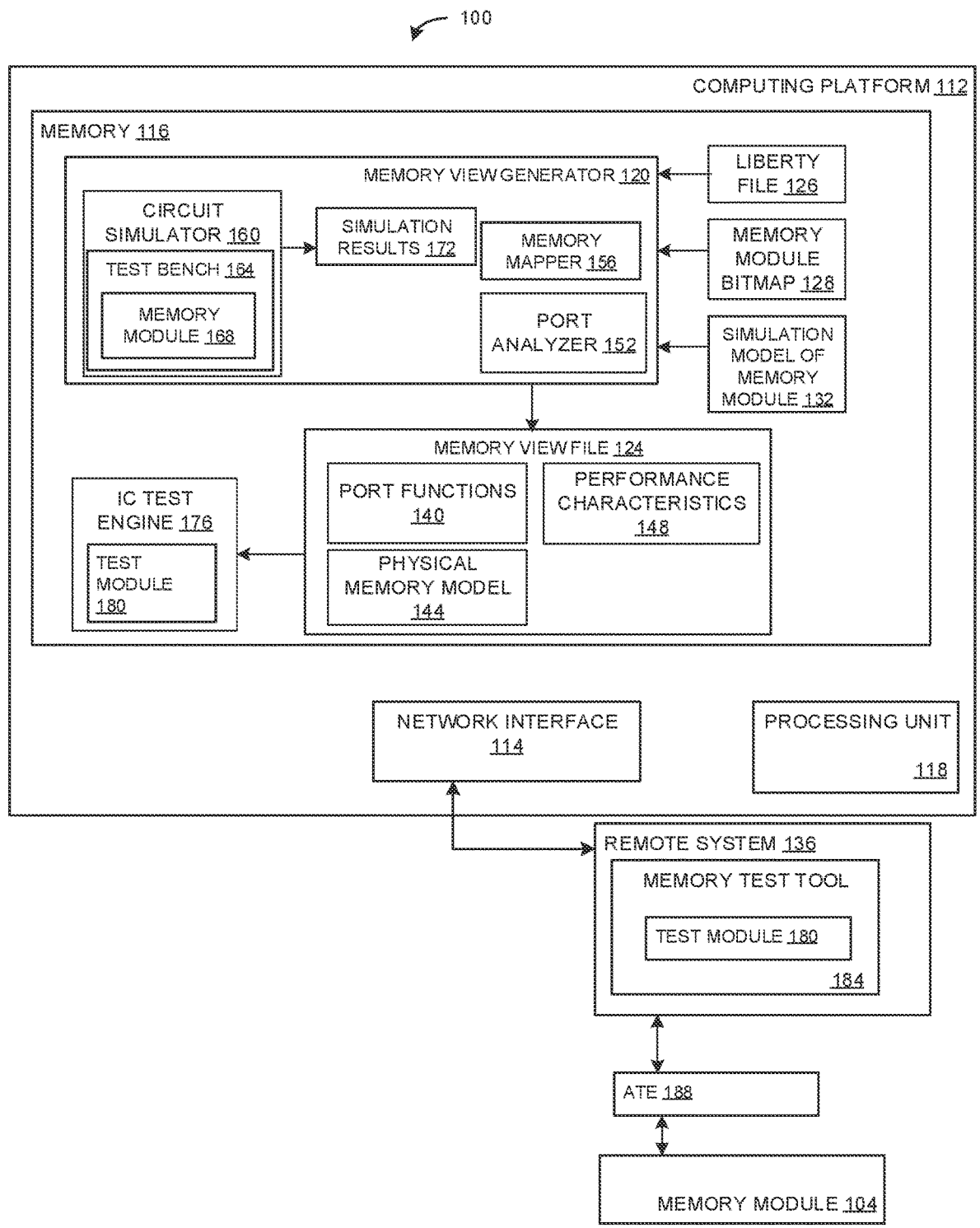
FIG. 1 illustrates an example of a system for generating a memory view file for a memory module that can be implemented on a physically instantiated integrated circuit (IC) chip.

FIG. 1 illustrates an example of a system 100 for generating a memory view file for a memory module 104 that can be implemented as a physically instantiated IC chip. The system 100 can include a computing platform 112. Accordingly, the computing platform 112 can include a memory 116 for storing machined readable instructions and data and a processing unit 118 for accessing the memory 116 and executing the machine-readable instructions. The memory 116 represents a non-transitory machine-readable memory (or other medium), such as RAM, a solid state drive, a hard disk drive or a combination thereof. The processing unit 118 can be implemented as one or more processor cores. The computing platform 112 can include a network interface 114 (e.g., a network interface card) configured to communicate with other computing platforms via a network, such as a public network (e.g., the Internet), a private network (e.g., a local area network (LAN)) or a combination thereof (e.g., a virtual private network).

The computing platform 112 could be implemented in a computing cloud. In such a situation, features of the computing platform 112, such as the processing unit 118, the network interface 114, and the memory 116 could be representative of a single instance of hardware or multiple instances of hardware with applications executing across the multiple of instances (i.e., distributed) of hardware (e.g., computers, routers, memory, processors, or a combination thereof). Alternatively, the computing platform 112 could be implemented on a single dedicated server or workstation.

In the examples described, the memory module 104 represents a physically instantiated computer memory, such as SRAM, ROM or DRAM. The memory 116 includes a memory view generator 120. The memory view generator 120 is configured/programmed to generate a memory view file 124 that represents data sufficient to fully test the memory module 104. The memory view generator 120 employs a Liberty file 126 (or a module design file, more generally), a memory module bitmap 128 (e.g., a bitmap file) and a simulation model of the memory module 132. In some examples, the Liberty file 126, the memory module bitmap 128 and the simulation model of the memory module 132 are provided from a remote system 136, such as a fabricator (e.g., manufacturer) of the memory module 104.

In the examples provided, the Liberty file 126 is an ASCII file that stores timing and power parameters, and/or other characterization data associated with the NVM module 104 in a standardized format. However, other formats are alternatively employable. Such other formats may be proprietary or standardized. Thus, in general, a module design file is employable in place of the Liberty file 126, wherein such a module design file includes features similar to the Liberty file 126. Stated differently, the Liberty file 126 is considered to be one example implementation of a module design file. Thus, the module design file contains characterization data (including timing and power parameters) for cells for an IC chip (e.g., the NVM module 104) that may be stored in a standardized format or a proprietary format.

The memory view file 124 includes a set of port functions 140 that characterize operation of ports (e.g., pins) on the memory module 104. The memory view file 124 also includes a physical memory model 144 that characterizes a physical layout of data bits, address bits, a number of row, column and bank address bits, an order of the rows and columns for data bits in the banks of the memory module 104 relative to logical memory addresses. Stated differently, the physical memory module 144 can include (but is not limited to) an address bus structure of the memory module 104, a number of row bits of the memory module 104, a number of column bits of the memory module 104, bank bits of the memory module, a row and column order for each data bit of each memory bank of the memory module 104. The memory view file 124 further includes performance characteristics 148 that characterizes operational performance of the memory module 104. The operational performance characteristics 148 can include a read delay, valid number of addresses, a write mask binding to data bits and information about spare resources, or some subset thereof.

The memory view generator 120 includes a port analyzer 152 that evaluates the Liberty file 126 and extracts features characterizing port (pin) operations, such as an identification of an address bus, a data bus, control signals, a power pin, a ground pin, input/output pins, signal naming, etc. More particularly, the port analyzer 152 employs the Liberty file 126 to determine known signal port naming conventions to determine an operation of each port (pin) on the memory module 104 (or some subset thereof). Additionally, in some examples where information regarding one or more of the ports is missing from the memory view file 124, the port analyzer 152 can execute a memory reading view command (or other operation) to enable reading a template file that contains such constructs to handle the missing information for the signal ports. Additionally or alternatively, where information regarding one or more of the ports is missing from the memory view file 124, a developer mode memory reading view command can gather the missing information from a data structure such as a database, and/or the information can be provided from another source. The port functions include a definition for a port test for a subset of the ports on the memory module and/or a port alias (e.g., a unique identifier) for a subset of the ports on the memory module. Further, the port functions can include a definition of a port function and a description of port test parameters. More generally, Table 1 includes a list of the port functions 140 included in the memory view file 124 that are available for each port of the memory module 104 or some subset thereof. Stated differently, Table 1 lists file structures that include information for each port (pin) of the memory module 104 (or some subset thereof) and the corresponding function.

TABLE 1

| Name | Description |
| --- | --- |
| port_alias { } | Description of port function |
| port_access { } | Memory pins/ports that can be controlled by user as per memory testing parameters of the user |
| port_action { } | Memory pins/ports that are controlled to specific values through-out the memory test and do not change during memory testing |
| port_test { } | Memory pins/ports that need to be controlled/observed during ATPG for improved fault coverage around memories |

In some examples, the port functions 140 can be modified for specific instances of the memory module 104 that have different characteristics. That is, in some examples, the Liberty file 126 can specify a module class for the memory module 104 as the particular type of memory module 104.

In this manner, the port functions 140 can be adjusted for variations of the type (class) of memory module selected to implement the memory module 104.

The memory view generator 120 also includes a memory mapper 156 that can provide the physical memory model 144 for the memory view file 124. More specifically, the memory mapper 156 parses the memory module bitmap 128 to determine a data order, data_order and an address partition, address_partition for the physical memory model 144. FIG. 2 illustrates an example of a portion of contents of a memory module bitmap 200, such as the memory module bitmap 128 of FIG. 1.

The memory module bitmap 200 includes a list of cartesian coordinates (alternatively referred to as x,y coordinates) for each data bit for each address in a memory module (e.g., the memory module 104 of FIG. 1). Each data bit has two columns, with a first column representing a true value and a second column representing a complement value, the cartesian coordinates represent physical locations (e.g., in nanometers (nm)) of the data bits relative to a reference point, such as a corner or a center of a memory cell. In other examples, the cartesian coordinates can represent different units.

In the example illustrated, generic variables, such as of 'x' and 'y', 'b' and 'd' are employed. In a practical instance of the memory module bitmap, actual numerical values are included in place of variables. The physical x-location and y-location of a bit line and a bit line bar for each memory cell are denoted as a pair of the x,y values. For instance, the pair labeled "x1,y1" defines the physical location of a bit line (true value) for a memory cell within the data bit 0. The pair labeled "x1b,y1" is the physical location of the bit line bar (complement value) for the same memory cell within the data bit 0. Further, for purposes of simplification of explanation, integer values are employed to denote physical separation between data bits. For example, when comparing "x1+1d,y1" from data bit 1 and "x1+2d,y1" from data bit 2, the variable 'd' indicates the physical separation between bit 1 and bit 2. The integer number before 'd' is used to indicate the size of the separation. For instance, '4d' denotes a distance that is four times greater than '1d'. In a similar fashion, integer values before an 'x' or 'y' term also denotes a set physical distance. For instance, in the example illustrated, it is presumed that 'y3' and 'y2' are separated by the same distance as 'y2' and 'y1'. Consistently, it is presumed that there is twice the distance between 'y3' and 'y1' as there is between 'y3' and 'y2'. In physical instantiations, there may be discrepancies.

To generate the data order value data_order, a memory mapper (e.g., the memory mapper 156 of FIG. 1) analyzes the memory module bitmap 200. The memory module bitmap 200 includes an address (labeled "#address") and a corresponding row of cartesian coordinates for five (5) data bits, namely data bit [0] to data bit [4]. As noted, each data bit has two (2) columns, a first column and a second column, wherein the first column stores a true value and the second column stores a complement value. The memory mapper identifies a first set of cartesian coordinates 204 that represents the physical location of data bit [0] for memory address '0000', having the smallest 'x' and 'y' values for the true value (the first column). In the example illustrated, the true value of data bit [0] of the memory address '0000' is located at position (x1,y1). The memory mapper progresses across data bits [0] to data bit [4] in the first row to identify the data order data_order, namely, 0,1,2,3,4 as indicated in Table 2. That is, the data order, data_order defines an order of data bits within a particular row. In the illustrated example, data bit [4] of memory address '0000' is located at position (x1+4d,y1) as indicated by a second set of cartesian coordinates 208. Moreover, because the 'y' coordinate for the first set of cartesian coordinates 204 (bit [0]) and the second set of cartesian coordinates 208 (bit [4]) remains constant at y1, it is presumed that bit [0] . . . bit [4] are in the same row in the memory module.

This memory mapper parses the memory module bitmap 200 for a memory address where the 'y' value in the cartesian coordinates increases. In the example illustrated, the 'y' value increases between memory address '0007' and memory address '0008', wherein the 'y' value increases from y1 to y2, as indicated in a third set of cartesian coordinates 212. The 'y' value also increases from y2 to y3 between memory address '000F' and memory address '0010', as indicated by a fourth set of cartesian coordinates 216. Accordingly, the memory mapper determines that there are 8 addresses per row of columns, such that address bits 3:0 are column address bits. Stated differently, the memory module has 8 columns, such that 3 bits can uniquely identify a column of the memory module. Further, as noted, there are 5 data bits per row, as indicated by the data_order, 0,1,2,3,4.

The process of identifying column address bits is repeated until addresses are identified wherein the 'y' increases by a different amount. In the present example, as indicated by the bubble 220 of an expanded partition 224, between addresses '007FF' and '00800', the 'y' value increases from y2047 to y2097, which is larger than the increase from address '0007' to '0008' to identify an address size of a memory bank. Thus, the memory module bitmap 200 determines that a first memory bank has memory address '0000' to '007FF' and that a second memory bank begins at memory address '00800'. Accordingly, in the memory module bitmap 200, the memory mapper is configured to determine that there are 256 rows of data bits per bank in the memory module.

In one example, the memory mapper can determine the address partition, address_partition for memory bank 1 to have an initial value defined in Table 2. In other examples, the values of the address partition, address_partition and the data order, data_order are different. In particular, the value of the address partition, address_partition for other memory banks can be determined with linear defaults for row and bank addressing.

TABLE 2

| Name | Value | Description |
| --- | --- | --- |
| data_order | {0, 1, 2, 3, 4} | Order of data bits of a row in a memory module |
| address_partition | {column 2:0 data {0:1} order {0:7} data {2:4} order {7:0}} | Order of columns for each data-bit inside a particular bank |

In summary, to determine the address_partition for each memory bank, the memory mapper can:
(i) sort data in a memory model bitmap based on x coordinate and y coordinates;
(ii) determine which addresses belong to a smallest 'x' value;
(iii) identify which bits remain constant for these addresses, thereby marking these bits as column bits;
(iv) repeat this process or the smallest 'x' addresses in a given bank to determine bank bits;
(v) repeat the process for the smallest 'y' to determine row bits.

Referring back to FIG. 1, in response to determining the port functions 140 and the physical memory model 144, the memory view generator 120 can cause a circuit simulator 160 to simulate the memory module 104 for generation of the performance characteristics 148 in the memory view file 124. The circuit simulator 160 employs the simulation model of the memory module 132, the port functions 140 and the physical memory model 144 to create a testbench 164 around the memory module 104 for use in a simulation analysis script and invoke the simulation analysis script to determine values for the performance characteristics 148 of the memory view file 124. More particularly, the circuit simulator 160 executes a simulation of the model of the memory module 132 by creating the test bench 164 over a memory module 168 using the simulation model of the memory module 132 and executes the simulation. The memory module 168 represents a instantiation of the memory module 104, and has functional signals, such as clock signals defined. Additionally, the test bench 164 connects a repair interface to the memory module 168 and initializes signals such as clocks and ports as well as the repair interface of the memory module 168. Table 3 defines the data structures for the performance characteristics 148 of the memory view file 124.

TABLE 3

| Name | Description |
| --- | --- |
| address_limit { } | The last addressable address in a memory bank |
| read_delay { } | The time interval between a read command and a time that a memory module responds |
| write_mask_binding { } | A list of data bits for which writing is controllable with a mask |
| redundancy { } | Information about spare resources, how to access the spare resources, what portion of memory the spare resources repairs, size of repair resource etc. |

In some examples, to determine the address limit, address_limit, the test bench 164 can write a value of '0' or '1' to every memory address of the memory module 168 of one or more memory banks and read back the writing results. If some memory addresses return a value of 'X' (where 'X' is a stand in for an unknown value), those addresses are not a valid location. In such a situation, the test bench 164 can be configured to set the lowest of these addresses (that returned a value of 'X') to the address limit, address_limit for the memory module 168. In other examples, to determine the address limit, address_limit, the test bench 164 can write a value of '0' or '1' to a last memory address in the memory module 168 and read back the data on the last memory address. If the last memory address reads back the value written on the last memory address, the test bench 164 can set the address limit, address_limit to the last address. Conversely, if the last memory address reads back a value of 'X', the test bench 164 can select a new memory address that is before the last memory address and write a value of '0' or '1' to the selected memory address. The test bench 164 reads back the value written to the selected memory address. If the selected memory address is a value of 'X', the selected memory address is reduced again (e.g., by one), and the process is repeated (e.g., writing a value to the selected memory address and reading back the written value) until the selected memory address reads back the value written thereto, and this address is selected as the address limit, address_limit.

Additionally, to determine the read delay, read_delay, for the memory module 104, the test bench 164 can write a value to a selected address of the memory module 168. The test bench 164 can issue a read command on the memory module 168 and count a number of clock cycles needed for the memory module 168 to return the value from the selected address. The number of clock cycles can be converted to the read delay, read_delay (e.g., in nanoseconds (ns)) or the number of clock cycles can be stored as the read delay, read_delay.

Further, the test bench 164 can be configured to determine the write mask binding, write_mask_binding for the memory module 104. To determine the write mask binding, write_mask_binding, the test bench 164 executes a loop of operations. Initially the test bench 164 enables each mask bit within a mask bit range. The test bench 164 selects a mask bit (e.g., a mask bit index, mx). The test bench 164 writes a value of '1' into a selected memory address (e.g., address 0). The test bench 164 disables the selected mask bit and writes '0's to the selected memory address (e.g., address 0). The test bench 164 reads the memory from the selected memory address, and data bits that do not change to a value of '0' a bound to the selected bit mask bit. The test bench 164 changes the selected mask bit, and the operation is repeated until each selected mask bit has been evaluated and values in the selected address have been bound to the write mask to determine the write mask binding, write_mask_binding.

Figure 3:
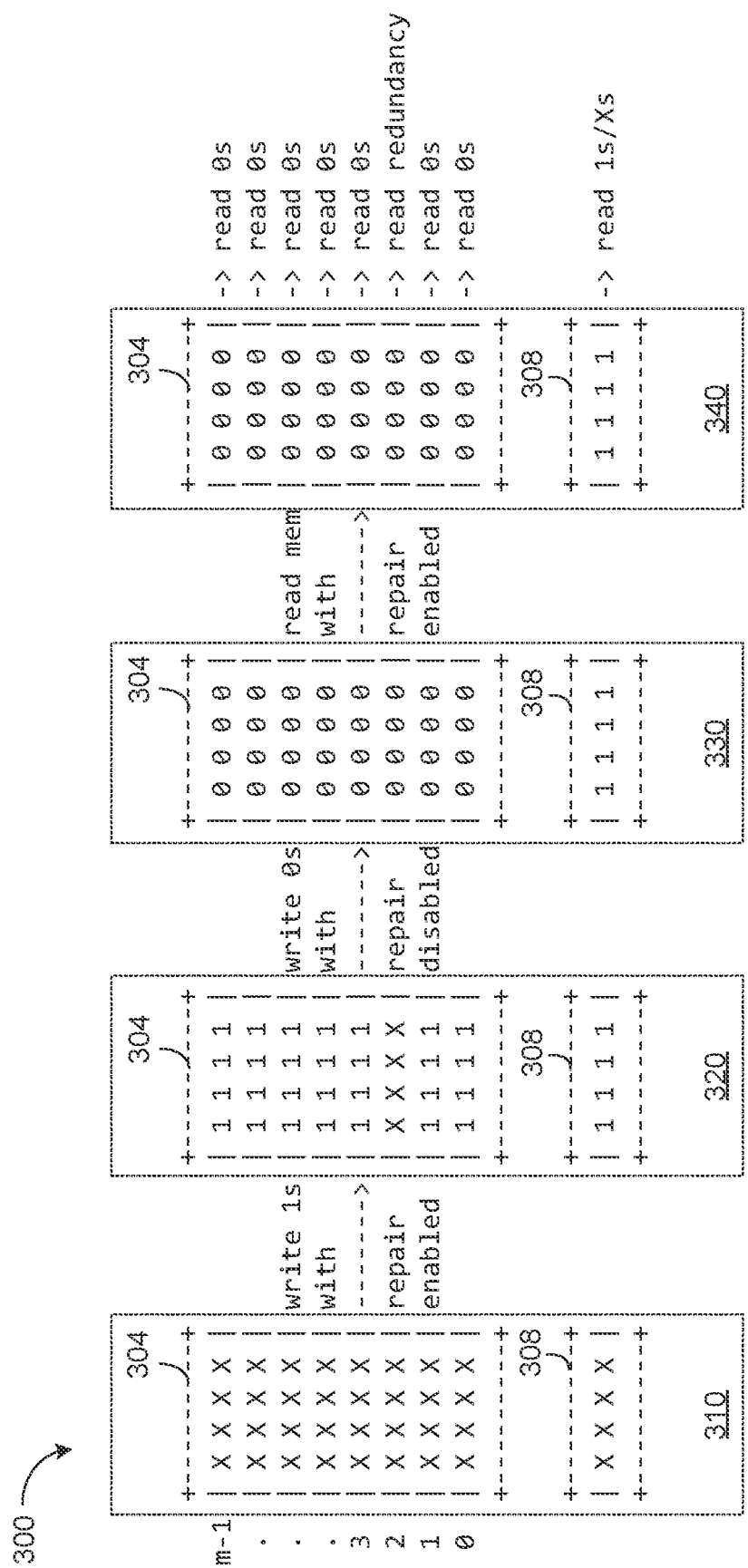
FIG. 3 illustrates a diagram of a first process for determining redundancy information of a memory module.

Further still, the test bench 164 can be configured to determine the redundancy information, redundancy. The redundancy information, redundancy can be determined in a number of ways. FIG. 3 illustrates a diagram of a first process 300 for determining redundancy information, redundancy of a single memory block for a memory bank. The first process 300 depicts ordered operations executed by the test bench 164 on a memory module 304, such as the memory module 168 of FIG. 1. The memory module 304 has memory row 0 to m−1, where m is a positive integer (e.g., 256). The memory module 304 includes a spare row resource 308 that is employable to replace a portion of the memory module 304.

At 310, the memory module 304 is uninitialized, such that a value of 'X' (e.g., a unknown value) is stored in each logical address of the memory module 304 and the spare resource 308. Also, at 310, the test bench writes a selected repair address (e.g., address 2 in the illustrated example) to a repair interface and enables a repair port (e.g., defined in the port functions 140 of FIG. 1) on the memory module 304. The repair bus can be one of two types:

Type 1. Parallel repair interface. A parallel repair interface can include a parallel bus for the repair address and a repair enable port for enable or disable repair; or Type 2. Serial repair interface. A serial repair interface can include a serial input, output, a clock, and an optional reset. The repair information is shifted into the repair shifter register in the memory.

The memory view generator is configured to recognize the port function based information in the port functions 140 of FIG. 1 and to generate corresponding logic to connect to the repair interface. At 320, the test bench writes values of '1' to each address in the memory module 304. Moreover, as illustrated, because the repair function is enabled or the repair is enabled, memory row 2 keeps values of 'X', and the spare resource 308 has values of '1' loaded therein. In examples where the repair interface is a parallel repair interface, the repair enable is controlled by a port. However, in examples where the repair interface is a serial repair interface, the repair enable is controlled by a bit in a repair shift register. In response to loading the values of '1', the test bench disables the repair or disables the repair function.

At 330, the test bench writes values of '0' to the memory module 304 (with the repair disabled or repair function disabled). Because the repair is disabled or the repair function is disabled, the spare resource 308 keeps the values of '1' loaded at 320. In response to loading the values of '0', the test bench re-enables the repair signal or repair function. At 340, the test bench reads the values stored in the memory module 304 in each logical address. For each logical address besides the logical address covered by the spare repair resource (e.g., the remaining logical addresses), values of '0' are returned (loaded at 330). Because the repair is enabled or the repair function is enabled, logical addresses within row 2 are covered by spare repair resource and return whatever value is stored in the spare resource 308, which are '1s' in the illustrated example. Additionally, at 340, the test bench changes the repair address, and the first process 300 is repeated for each memory address or a set of reduced addresses for performance optimization in the memory module 304. In some situations, reading a value of 'X' from the spare resource 308 for a particular selected repair address indicates that the spare resource 308 is not employable to provide redundancy (e.g., backup) for the particular repair address. Additionally or alternatively, reading a value of 'X' from the memory simulation model can make the spare resource have a value of 'X' when the repair is enabled and then disabled. Thus, by executing the first process 300 for each logical address and repair address of the memory module 304, the test bench can determine which memory logical addresses are replaceable with the spare resource 308 when the repair address is applied and/or the size of the spare resource 308. Because the repair address is used to indicate which row(s)/column(s) be replaced by the spare resource, each repair address can cover one or more logical addresses. Moreover, the information characterizing the memory addresses that are replaceable with the spare resource 308 and/or the size of the spare resource are employable as the redundancy information, redundancy of Table 3.

Figure 4:
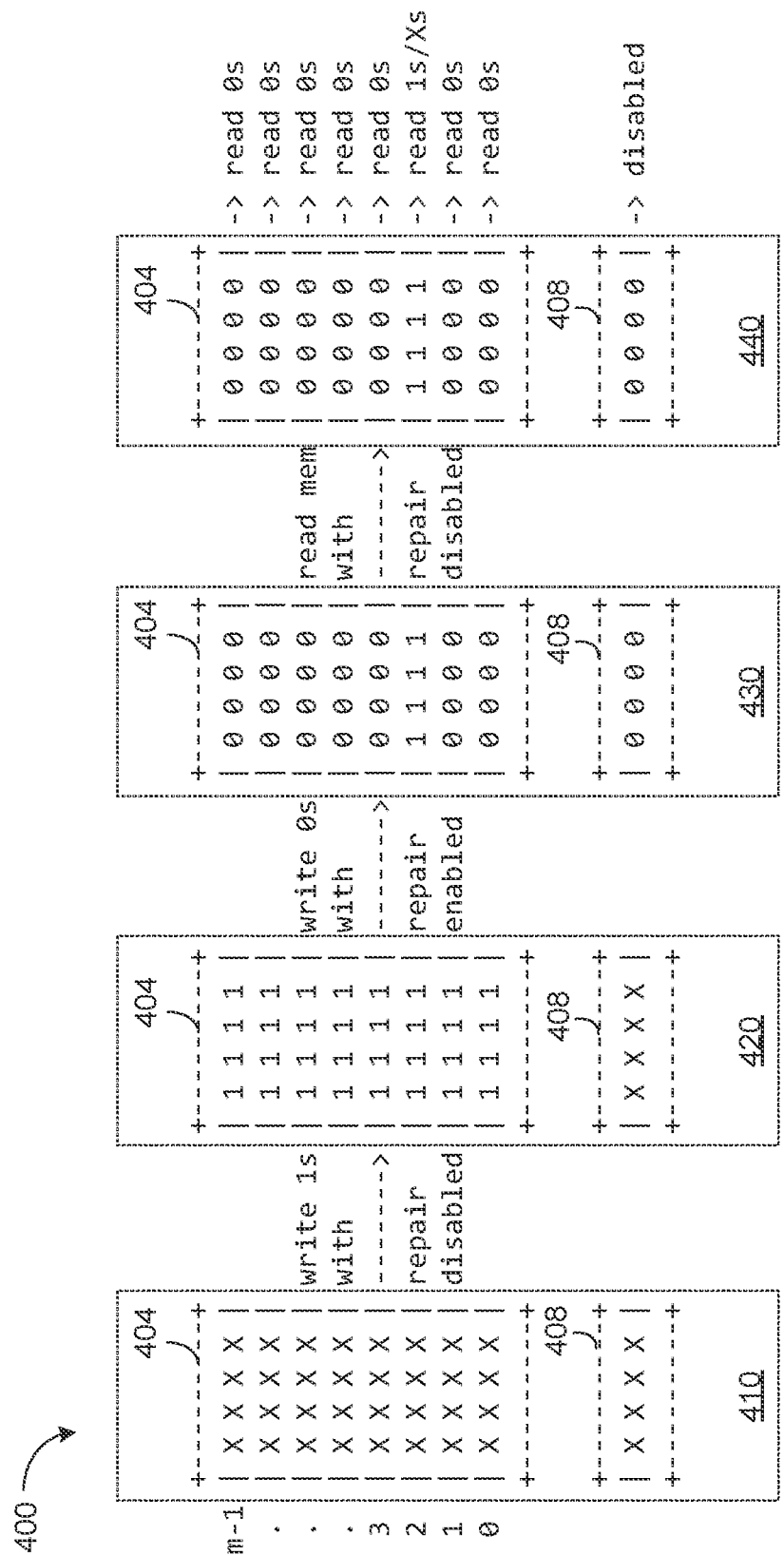
FIG. 4 illustrates a diagram of a second process for determining redundancy information of a memory module.

FIG. 4 illustrates a diagram of a second process 400 for determining redundancy information, redundancy. The second process 400 depicts ordered operations executed by the test bench 164 on a single memory block of a memory bank of a memory module 404, such as the memory module 168 of FIG. 1. The memory module 404 has memory row 0 to m−1, where m is a positive integer (e.g., 256). The memory module 404 includes a spare row resource 408 that is employable to replace a portion of the memory module 404.

At 410, the memory module 404 is uninitialized, such that a value of 'X' (e.g., an unknown value) is stored in each logical address of the memory module 404 and the spare row resource 408. Also, at 410, the test bench writes a selected repair address (e.g., address 2 in the illustrated example) to a repair interface (e.g., defined in the port functions 140 of FIG. 1) on the memory module 404. At 420, the test bench writes values of '1' to each logical address in the memory module 404. In response to writing values of '1' to each address, the test bench enables the repair or repair function. In examples where the repair interface is a parallel repair interface, the repair enable is controlled by a port. However, in examples where the repair interface is a serial repair interface, the repair enable is controlled by a bit in a repair shift register.

At 430, value 0 is written into the spare row resource with the repair enabled. Because the repair is enabled or the repair function is enabled, the spare resource 408 keeps the values of '0' loaded at 420, and the logical addresses covered by row 2 keeps the values of '1' loaded therein. As compared to the operations at 420, the spare resource changes from X to 0. In response to loading the values of '0', the test bench re-disables the repair signal or repair function. As demonstrated, when enabling the repair or repair function with a repair address, instead of read/write to the original logical address in row 2, the read/write will be redirected to the spare resource.

At 440, the test bench reads the values stored in the memory module 404 in each logical address. For each logical address covered by the spare resource (e.g., the remaining logical addresses), values of '0' are returned (loaded at 430). Because the repair signal or repair function is disabled, the logical addresses covered by the spare resource (e.g., row 2) returns the value written at 420 (e.g., '1s' in the present example). Additionally, at 440, the test bench changes the repair address, and the first process 400 is repeated for each memory address in the memory module 404. In some situations, reading a value of 'X' for a particular selected repair address indicates that the spare resource 408 is not employable to provide redundancy for the particular selected repair address. Thus, by executing the second process 400 for each memory address of the memory module 404, the test bench can determine which logical addresses are replaceable with the spare resource 408 when the selected repair address is applied and/or the size of the spare resource 408. Moreover, the information characterizing the memory addresses that are replaceable with the spare resource 408 and/or the size of the spare resource are employable as the redundancy information, redundancy of Table 3.

Figure 5:
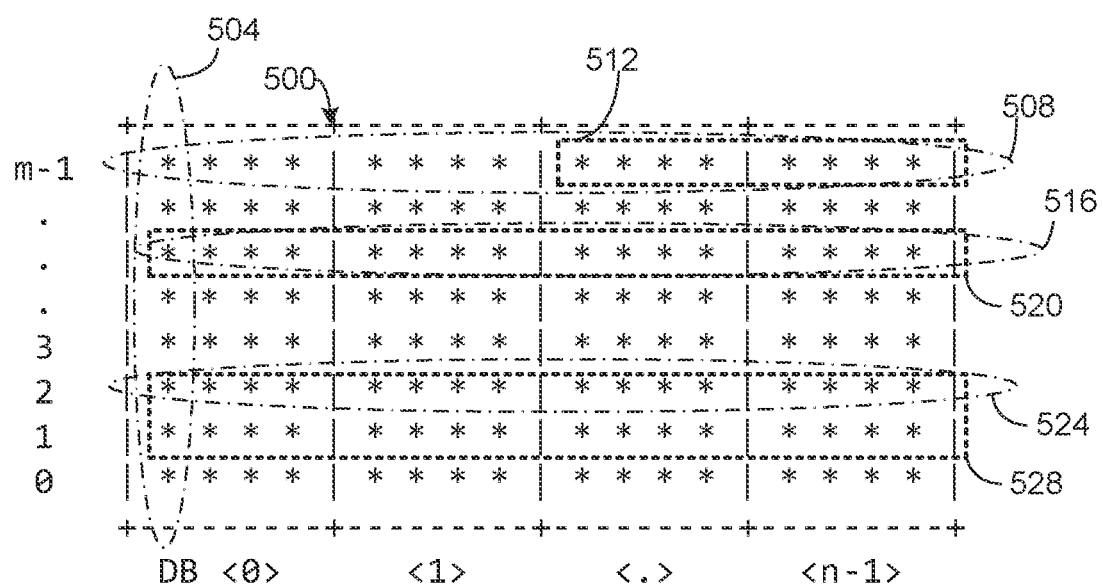
FIG. 5 illustrates an example of a memory module wherein a test bench determines a size of a spare resource that is implemented as a row repair spare resource.

Referring back to FIG. 1, in other examples, the first process 300 and/or the second process 400 can be applied to the whole memory module 168. Additionally, in some examples, the test bench 164 can write to a subset of memory addresses to determine a size of a spare resource. In some examples, the port functions 140 specify whether the spare resource is a row repair spare resource or a column repair spare resource. FIG. 5 illustrates an example of the memory module 500 (e.g., an instance of the memory module 168 of FIG. 1) wherein a test bench (e.g., the test bench 164 of FIG. 1) determines a size of a spare resource that is implemented as a row repair spare resource. The memory module 500 includes m (e.g., 256) rows that each have n number of data bits, where m is an integer greater than one (e.g., 4, 8, 16, etc.). As one example, to determine the size of the spare resource, the test bench can select a repair address and provide the selected repair address to a repair interface (defined in the port functions 140 of FIG. 1) and write a first value (e.g., a '0') to columns of a selected memory row (e.g., row m−1) of the memory module 500, and then disable the repair signal or repair function. The test bench can write a second value (e.g., '1') to the columns of a selected memory row (e.g. m−1) of the memory module 500 (the second value being the complement of the first value) and re-enable the repair signal or repair function, and then read back the values stored in the columns of the selected memory row (e.g. m−1).

If each value in the selected single row stores the second value (e.g., '1') and a subset of the row address stores the first value (e.g., '0'), the test bench determines that the spare resource stores less than a full row of the memory module 500. For instance, suppose that the selected memory row is m−1 which is represented by an ellipse 508 in the memory module 500. Additionally, suppose that the repaired bits are represented with a box 512. Accordingly, analysis of the selected memory row reveals that some of the bits from the selected memory row of the ellipse 508 are not repaired. Thus, the testbench can determine that the repair size of the spare resource is a portion of the memory module 500.

In another situation, if a selected single row of the selected column stores the first value (e.g., '0'), the remaining rows store the second value (e.g., '1'), and each of the selected address stores the first value, the test bench determines that the spare resource stores a (single) full row of the memory module 500. For instance, suppose that the ellipse 516 represents the selected memory row address. Additionally, suppose that the repaired bits are represented with a box 520. In this situation, each data bit in the selected row address is repaired. Thus, the testbench can determine that the repair size of the spare resource is a single row of the memory module 500.

In yet another situation, if G number of rows (where G is an integer of two or greater) stores the first value (e.g., '0') and the remaining rows store the second value (e.g., '1'), and each of the selected memory row addresses stores the first value, the test bench determines that the spare resource stores G rows of the memory module 500. For instance, suppose that the ellipse 524 represents the selected memory row. Additionally, suppose that the repaired bits are represented with a box 528. In this situation, each data bit in the memory bits within the box 528 is repaired. Thus, the testbench can determine that the repair size of the repair resource is G number (2 for the box 528 in the illustrated example) of full rows of the memory module 500.

Figure 6:
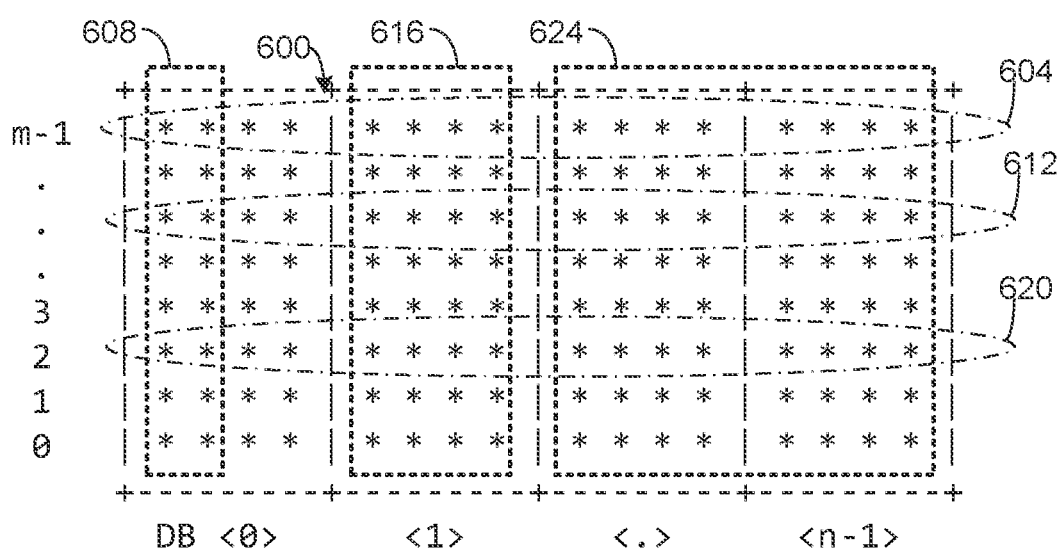
FIG. 6 illustrates an example of a memory module wherein a test bench determines a size of a spare resource that is implemented as a column repair spare resource.

FIG. 6 illustrates an example of a memory module 600 (e.g., an instance of the memory module 168 of FIG. 1) wherein a test bench (e.g., the test bench 164 of FIG. 1) determines a size of a spare resource that is implemented as a column repair spare resource. The memory module 600 includes m rows (e.g., 256) rows that each have n number of data bits, where n is an integer greater than one (e.g., 4, 8, 16, etc.). As one example, to determine the size of the spare resource, the test bench can select an address and provide the selected address to a repair bus and enable a repair port (defined in the port functions 140 of FIG. 1) and write a first value (e.g., a '0') to the selected address of the memory module 600, and then disable the repair signal or repair function. The test bench can write a second value (e.g., '1') to the selected address of the memory module 600 (the second value being the complement of the first value) and re-enable the repair or repair function, and then read back the values stored in the selected address.

If a portion of a single data bit in the selected address stores the first value (e.g., '0') and the remaining data bits of the selected address stores the second value (e.g., '1'), the test bench determines that the spare resource stores a portion of a data bit for the memory module 600. For instance, suppose that the selected memory row is m−1. Thus, a first ellipse 604 represents the selected row. Additionally, suppose that the repaired bits are represented with a box 608. In this situation, examining the values stored in the selected row reveals that a subset of the bits stored in the selected row corresponding to the first ellipse 604 have been repaired. Thus, in this situation, the test bench can determine that the repair size of the spare resource is a portion of a single data bit for a column in the memory module 600.

In another situation, if a single data bit of the selected address stores the first value (e.g., '0'), the remaining data bits of the selected address store the second value (e.g., '1'), the test bench determines that the spare resource stores a (single) full data bit in a column of the memory module 600. For instance, suppose that a second ellipse 612 represents the selected address. Additionally, suppose that the repaired bits are represented with a box 616. In this situation, a full data bit in the selected address, is repaired. Thus, in this situation, the test bench can determine that the repair size of the spare resource is a full data bit of a column of the memory module 600.

In yet another situation, if G number of data bits (where G is an integer equal to two or greater) of the selected address stores the first value (e.g., '0'), the remaining data bits of the selected address store the second value (e.g., '1'), the test bench determines that the spare resource stores G data bits for columns of the memory module 600. For instance, suppose that a third ellipse 620 represents the selected address. Additionally, suppose that the repaired bits are represented with a box 624. In this situation, each G number of data bits in the selected address are repaired. Thus, in this situation, the test bench can determine that the repair size of the spare resource is G number of data bits for a column of the memory module 600.

Referring back to FIG. 1, by employing the procedures described with respect to FIGS. 5 and 6, the test bench 164 does not need to write and read from every memory cell in the memory module 168 to determine the redundancy information, redundancy. Further, in some examples optimizations for the procedures of FIGS. 5 and/or 6 are possible. More particularly, the test bench 164 can employ the operations illustrated in FIGS. 5 and 6 by only writing to and reading from a subset of addresses in the memory 168. For example, for a spare row resource, the test bench 168 may be configured to only write to and read from addresses associated with a single column (e.g., column 0) per bank. As spare row resource is associated with rows, covering addresses with any one column enables tracking of each row of that bank. Similarly, for a spare column resource, the test bench 168 may be configured to only write to and read from addresses associated with a single row (e.g., row 0) per bank. As spare column resource is associated with columns, covering addresses of any single row enables tracking of each columns of that bank. Additionally or alternatively, other optimization techniques are also possible. Accordingly, the redundancy information, redundancy provides a map that allocates the spare resource (or multiple spare resources) of the memory module 168 to memory addresses.

The test bench 164 can output simulation results 172 that characterize results of the simulations and test executed on the memory module 168. In particular, the simulation results 172 characterizes the address limit, address_limit, the read delay, read_delay, the write mask binding, write_mask_binding and the redundancy information, redundancy, and other information can be included. The memory view generator 120 can sort and collate (e.g., analyze) the simulation results 172 and store the performance characteristics 148 in the memory view file 124 characterizing the simulation results 172 or some portion thereof. Accordingly, the memory view file 124 includes the port functions 140 characterized in Table 1, the physical memory model 144 characterized in Table 2 and the performance characteristics 148 characterized in Table 3. Thus, the structure of the memory view file 124 can be summarized with Table 4.

TABLE 4

| Name | Description |
|---|---|
| PORT FUNCTIONS | |
| port_alias { } | Description of port function |
| port_access { } | Memory pins/ports that can be controlled by user as per |

TABLE 4-continued

| Name | Description |
|---|---|
| | memory testing parameters of the user |
| port_action { } | Memory pins/ports that are controlled to specific values through-out the memory test and do not change during memory testing |
| port_test { } | Memory pins/ports that need to be controlled/observed during ATPG for improved fault coverage around memories |
| PHYSICAL MEMORY MODEL | |
| data_order | Order of data bits of a row in a memory module |
| address_partition | Order of columns for each data-bit inside a particular bank |
| PERFORMANCE CHARACTERISTICS | |
| address_limit { } | The last addressable address in a memory bank |
| read_delay { } | The time interval between a read command and a time that a memory module responds |
| write_mask_binding { } | A list of data bits for which writing is controllable with a mask |
| redundancy { } | Information about spare resources, how to access the spare resources, what portion of memory the spare resources repairs, size of repair resource etc. |

The memory 116 can include an IC chip test engine 176 that receives the memory view file 124. The IC chip test engine 176 can process the memory view file 124 to generate a test module 180 (e.g., test patterns) that are provided to a memory test tool 184 operating on the remote system 136 (wherein the remote system 136 can be a the same or different system as the system providing the Liberty file 126, the memory module bitmap 128 and the simulation model of the memory module 132). The memory test tool 184 can communicate with automatic test equipment (ATE) to insert hardware and software for a built-in memory self test (BIST) into the memory module 104 (e.g., an IC chip). Additionally, the ATE 188 can apply the test patterns to the memory module 104 (a physical instantiation) to ensure that the memory module 104 is operating properly. In some examples, the IC chip test engine 176, the test module 180 and the memory test tool 184 are operating on a common computing platform.

By employment of the computing platform 112, the memory view file 124 is generated from information that is distributed from the fabricator of the memory module 104. Additionally, generation of the memory view file 124 does not require any physical interaction with the memory module 104. Thus, there is no requirement that the operation of the computing platform 112 ever receive a physical instantiation of the memory module 104 to generate the memory view file 124. Instead, the memory view file 124 can be generated by the memory view generator 120 based on the Liberty file 126, the memory module bitmap 128 and the simulation model of the memory module 132. Moreover, the memory view file 124 can be distributed for testing instances of the memory module 104.

Figure 7:
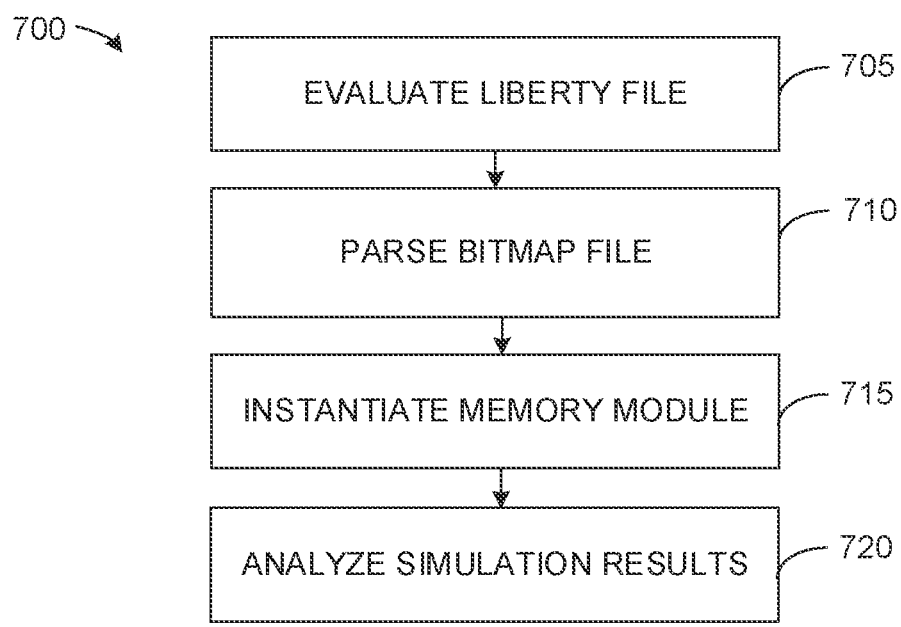
FIG. 7 illustrates a flowchart of an example method for generating a memory view of a memory module.

In view of the foregoing structural and functional features described above, example methods will be better appreciated with reference to FIG. 7. While, for purposes of simplicity of explanation, the example method of FIG. 7 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 7 illustrates a flowchart of an example method 700 for generating a memory view of a memory module. At 705, a memory view generator (e.g., the memory view file 124 of FIG. 1) operating on one or more computing devices, evaluates a Liberty file (or a module design file, more generally; e.g., the Liberty file 126 of FIG. 1) characterizing the memory module to generate a set of port functions that defines operations of ports on a memory module for a memory view file. At 710, the memory view generator, parses a memory module bitmap (e.g., the memory module bitmap 128) characterizing a physical layout of the memory IC chip to determine a physical memory model of data bits of the memory module for the physical memory view file. At 715, a circuit simulator, operating on the one or more computing devices instantiates a memory module and provide simulation results based on a simulation model of the memory module, the set of port functions and the physical memory model. At 720, the memory view generator analyzes the simulation results to determine operational performance characteristics of the memory module for the memory view file.

Figure 8:
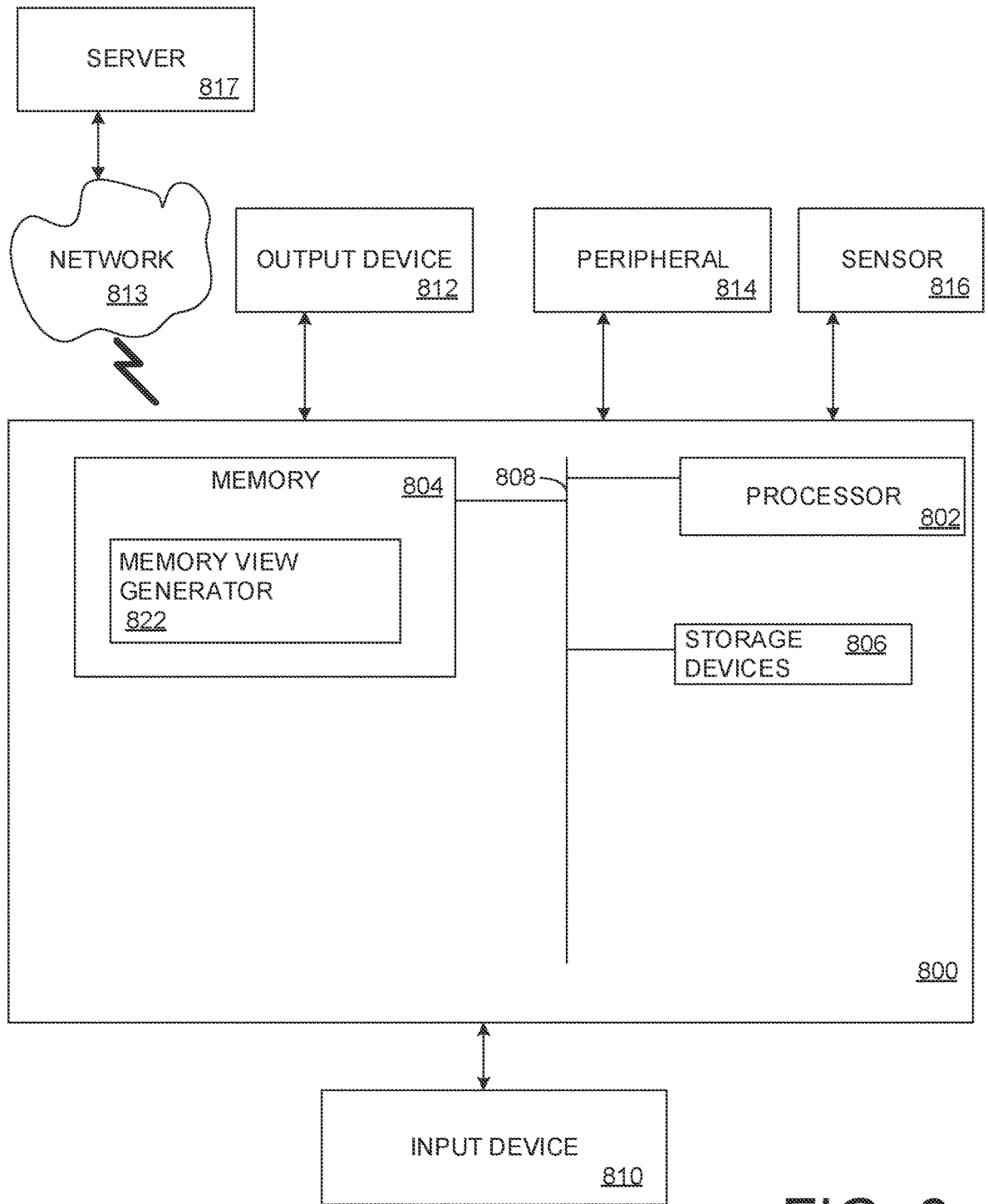
FIG. 8 illustrates an example of a computing system employable to generate a memory view file.

The examples herein may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory and input and output device(s) to perform one or more embodiments. As shown in FIG. 8, the computing system 800 can include a computer processor 802, associated memory 804 (e.g., RAM), cache memory, flash memory, etc.), one or more storage devices 806 (e.g., a solid state drive, a hard disk drive, an optical drive such as a compact disk (CD) drive or digital versatile disk (DVD) drive, a flash memory stick, etc.) and numerous other elements and functionalities. The computer processor 802 may be an IC chip for processing instructions. For example, the computer processor may be one or more cores, or micro-cores of a processor. Components of the computing system 800 can communicate over a data bus 808.

The computing system 800 may also include an input device 810, such as any combination of one or more of a touchscreen, keyboard, mouse, microphone, touchpad, electronic pen, or any other input device. Further, the computing system 800 can include an output device 812, such as one or more of a screen (e.g., light emitting diode (LED) display, an organic light emitting diode (OLED) display, a liquid crystal display (LCD), a plasma display, touchscreen, cathode ray tube (CRT) monitor, projector, or other display device), a printer, external storage, or any other output device. In some examples, such as a touch screen, the output device 812 can be the same physical device as the input device 810. In other examples, the output device 812 and the input device 810 can be implemented as separate physical devices. The computing system 800 can be connected to a network 813 (e.g., LAN, a wide area network (WAN) such as the Internet, a mobile network, or any other type of network) via a network interface connection (not shown). The input device 810 and output device(s) 812 can be connected locally and/or remotely (e.g., via the network 813) to the computer processor 802, the memory 804 and/or the storage devices 806. Many different types of computing systems exist, and the aforementioned input device 810 and the output device 812 can take other forms. The computing system 800 can further include a peripheral 814 and a sensor 816 for interacting with the environment of the computing system 800 in a manner described herein.

Software instructions in the form of computer readable program code to perform embodiments disclosed herein can be stored, in whole or in part, temporarily or permanently, on a non-transitory computer readable medium such as a CD, DVD, storage device, a diskette, a tape, flash memory, physical memory, or any other computer readable storage medium. Specifically, the software instructions can correspond to computer readable program code that when executed by a processor, is configured to perform operations disclosed herein. The computing system 800 can communicate with a server 817 via the network 813.

The memory 804 can include a memory view generator 822 to generate a memory view file for a physically instantiated memory module. Further, one or more elements of the aforementioned computing system 800 can be located at a remote location and connected to the other elements over a network 813. Additionally, some examples can be implemented on a distributed system having a plurality of nodes, where each portion of an embodiment can be located on a different node within the distributed system. In one example, the node corresponds to a distinct computing device. Alternatively, the node can correspond to a computer processor with associated physical memory. The node can alternatively correspond to a computer processor or micro-core of a computer processor with shared memory and/or resources.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications and variations that fall within the scope of this application, including the appended claims. As used herein, the term "includes" means includes but not limited to, the term "including" means including but not limited to. The term "based on" means based at least in part on". Additionally, where the disclosure or claims recite "a," "an," "a first," or "another" element, or the equivalent thereof, it should be interpreted to include one or more than one such element, neither requiring nor excluding two or more such elements.

What is claimed is:

1. A non-transitory machine-readable medium having machine-readable instructions, the machine-readable instructions comprising:
   a memory view generator that:
      evaluates a module design file characterizing a memory module to generate a set of port functions that defines operations of ports on a memory module for a memory view file;
      parses a memory module bitmap characterizing a physical layout of the memory module to determine a physical memory model of address bits, an order of rows, an order of columns, an order of banks and data bits of the memory module for the physical memory view file; and
   a circuit simulator that instantiates a memory module and provide simulation results based on a simulation model of the memory module, the set of port functions and the physical memory model;

wherein the memory view generator analyzes the simulation results to determine operational performance characteristics of the memory module for the memory view file.

2. The medium of claim 1, wherein the module design file is a Liberty file.

3. The medium of claim 1, wherein the set of port functions comprises a port alias for a subset of the ports on the memory module and the operational performance characteristics comprise a read delay of the memory module, a valid number of addresses of the memory module, a write mask binding to data bits of the memory module and information about spare resources of the memory module.

4. The medium of claim 1, wherein the physical memory model comprises a physical order of data bits in the memory module that are generated based on cartesian coordinates of bits included in the memory module bitmap.

5. The medium of claim 4, wherein the physical memory module further comprises an address bus partition and a physical order of rows and columns of a memory bank of the memory module that are generated based on the cartesian coordinates of bits included in the memory module bitmap.

6. The medium of claim 1, wherein the circuit simulator is configured to write a value to a set of data bits in a simulation of the memory module and to count clock cycles needed to execute a memory read at the set of data bits in the simulation of the memory module to determine a read delay of data bits in the memory module, and the read delay of the data bits of the memory module is a performance characteristic of the memory module.

7. The medium of claim 6, wherein the circuit simulator is configured to write to and to read from selected memory addresses on the simulated memory module to determine a valid number of memory addresses for data bits in the memory module, and the address limit is a performance characteristic of the memory module.

8. The medium of claim 6, wherein the circuit simulator is configured to iteratively execute a simulation loop that writes two different values to a memory address for the simulation of the memory module by writing a first value of the two different values to the memory address with a mask bit enabled and a second value of the two different values to the memory address with the mask bit disabled, and reading back data from the memory address in each iteration to identify data bits bound to a mask bit index and to identify the mask bits bound to the data-bit index as a performance characteristic of the memory module.

9. The medium of claim 6, wherein the performance characteristics of the memory module further comprises a redundancy information characterizing a spare resource of the memory module.

10. The medium of claim 9, wherein the circuit simulator:
provides a spare resource address of the memory module to a repair bus for a spare resource;
enables a repair or repair function on the simulation of the memory module;
writes a given value to a spare resource address of the memory module and to a memory address range with the memory module, wherein the memory address range includes the spare resource address;
disables the repair or the repair function;
writes another value to the selected address range of the memory module;
enables the repair or the repair function; and
reads contents from the address range of the memory module, wherein the spare resource address returns the given value, and remaining memory addresses within the selected memory address return the other value to determine a size of the spare resource.

11. The medium of claim 9, wherein the circuit simulator:
provides a spare resource address of the memory module to a repair bus for a spare resource;
disables a repair or repair function on the simulation of the memory module;
writes a given value to a spare resource of the memory module and to a memory address range with the simulation of the memory module, wherein the memory address range includes the spare resource address;
enables the repair or the repair function;
writes another value to the selected address range of the memory module;
disables the repair or the repair function; and
reads contents from the address range of the memory module, wherein the spare resource address returns the given value, and remaining memory addresses within the spare resource address return the other value to determine a size of the spare resource.

12. A system comprising:
a non-transitory memory that stores machine-readable instructions;
a processing unit that accesses the memory and executes the machine-readable instructions, the machine-readable instructions comprising:
a memory view generator that:
evaluates a Liberty file characterizing a memory module to generate a set of port functions that defines operations of ports on a memory module for a memory view file;
parses a memory module bitmap characterizing a physical layout of the memory module to determine a physical memory model of address bits, an order of rows, an order of columns, an order of banks and data bits of the memory module for the physical memory view file; and
a circuit simulator that instantiates a memory module and provide simulation results based on a simulation model of the memory module, the set of port functions and the physical memory model;
wherein the memory view generator analyzes the simulation results to determine operational performance characteristics of the memory module for the memory view file; and
a memory test tool that receives the memory view file and inserts testing hardware and software into the memory module and generates a test pattern for the memory module based on the memory view file.

13. The system of claim 12, wherein the set of port functions comprises:
a port alias for a subset of the ports on the memory module.

14. The system of claim 12, wherein the physical memory model comprises:
a data order for data bits in the memory module;
an address bus structure of the memory module;
a number of row bits of the memory module;
a number of column bits of the memory module;
bank bits of the memory module; and
a row and column order for each data bit of each memory bank of the memory module.

15. The system of claim 12, wherein the circuit simulator is configured to write a value to a set of data bits in a simulation of the memory module and to count clock cycles needed to execute a memory read at the set of data bits in the simulation of the memory module to determine a read delay of data bits in the memory module, and the read delay of the data bits of the memory module is stored as a performance characteristic of the memory module.

16. The system of claim 15, wherein the circuit simulator:
provides a spare resource address of the memory module to a repair bus for a spare resource;
enables a repair or a repair function on the simulation of the memory module;
writes a given value to a spare resource of the memory module and to a memory address range with the memory module, wherein the memory address range includes the spare resource address;
disables the repair or the repair function;
writes another value to the selected address range of the memory module;
enables the repair or the repair function; and
reads contents from the address range of the memory module, wherein the spare resource address returns the given value, and remaining memory addresses within the selected memory address range return the other value to determine a size of the spare resource.

17. The system of claim 16, wherein the spare resource is a column spare resource or a row spare resource.

18. A method for generating a memory view of a memory module, the method comprising:
evaluating, by a memory view generator operating on one or more computing devices, a Liberty file characterizing the memory module to generate a set of port functions that defines operations of ports on a memory module for a memory view file;
parsing, by the memory view generator, a memory module bitmap characterizing a physical layout of the memory module to determine a physical memory model of address bits, an order of rows, an order of columns, an order of banks and data bits of the memory module for the physical memory view file;
instantiating, by a circuit simulator, a memory module and provide simulation results based on a simulation model of the memory module, the set of port functions and the physical memory model; and
analyzing, by the memory view generator, the simulation results to determine operational performance characteristics of the memory module for the memory view file.

19. The method of claim 18, further comprising:
writing to selected memory addresses on the simulated memory module to determine an address limit of memory addresses for data bits in the memory module, and the address limit is a performance characteristic of the memory module.

20. The method of claim 18, further comprising:
providing, by the circuit simulator a spare resource address of the memory module to a repair bus;
disabling, by the circuit simulator, a repair or a repair function on the simulation of the memory module;
writing, by the circuit simulator, a given value to a spare resource of the simulation of the memory module and to a memory address range with the simulation of the memory module, wherein the memory address range includes the spare resource address;
enabling, by the circuit simulator, the repair or the repair function;
writing another value to the selected address range of the memory module;
disabling, by the circuit simulator, the repair or the repair function; and
reading, by the circuit simulator, content from the address range of the memory module, wherein the spare resource address returns the given value, and remaining memory addresses within the spare resource address return the other value to determine a size of the spare resource.

* * * * *